Feb. 14, 1939.  L. RICEFIELD  2,146,764
COUPLING
Filed Dec. 21, 1936
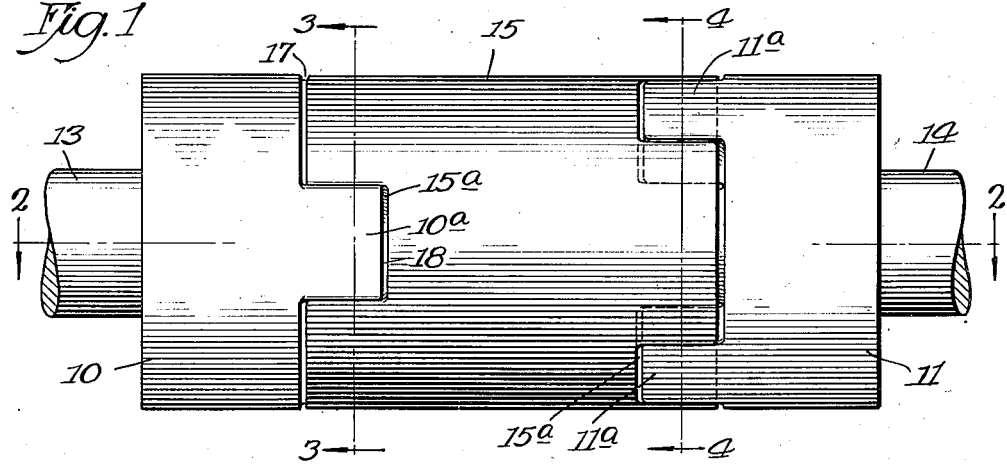
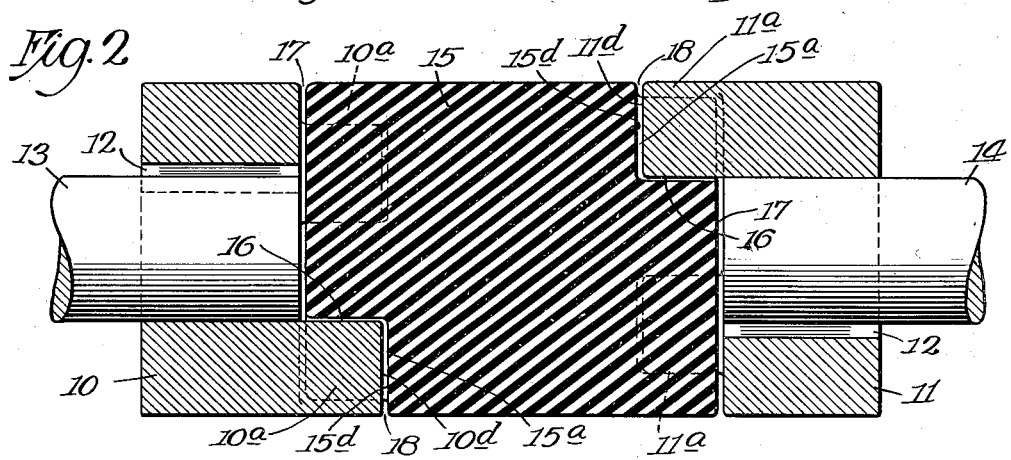
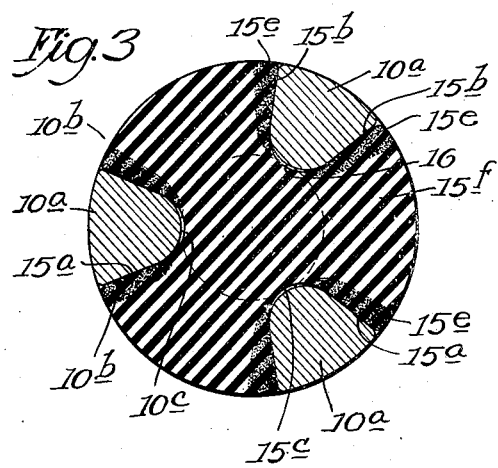
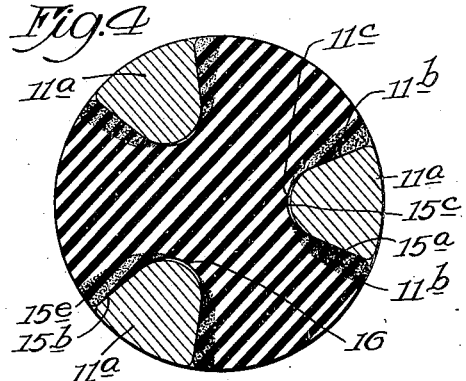
Inventor:
Louis Ricefield
By Davis, Lindsey, Smith & Shonts,
Attys.

Patented Feb. 14, 1939

2,146,764

UNITED STATES PATENT OFFICE 2,146,764

COUPLING

Louis Ricefield, Oak Park, Ill.

Application December 21, 1936, Serial No. 116,845

5 Claims. (Cl. 64—11)

This invention relates to improvements in couplings for connecting two substantially aligned shafts and its purpose is to provide an improved device adapted to compensate for angular misalignment and relative lateral displacement of the shafts and to permit relative endwise movement of the shafts during their rotation. In my prior United States Patents, Nos. 2,025,828 and 2,025,829, both dated December 31, 1935, for example, there are disclosed certain forms of couplings for connecting substantially aligned shafts in which the coupling comprises a pair of coupling members, each adapted to be secured upon one of the shafts and each having a plurality of longitudinally extending jaws adapted to intermesh loosely with the jaws carried by the other coupling member, the adjacent jaws carried by opposite coupling members being adapted to receive between them the radiating arms of a power transmitting spider formed partly or wholly of resilient deformable material such as rubber, leather, or rubber composition, so that the spider arms act primarily under compression when forces are transmitted from one coupling member to the other. While couplings of this type are satisfactory for all ordinary uses, it has been found that there are many situations where the degree of angular misalignment or relative lateral displacement of the shafts is such that compensation for this condition can not be efficiently provided by a coupling having a power transmitting spider of relatively short length measured longitudinally of the connected shafts.

It is the principal object of the present invention to provide an improved form of coupling having many of the desirable characteristics of the type of coupling referred to above in which provision is made for allowing a relatively great degree of angular misalignment or lateral displacement of the connected shafts. A further object of the invention is to provide an improved coupling member having a pair of coupling members each adapted to be secured upon one of the connected shafts and each having a plurality of longitudinally extending lugs or jaws which are adapted to enter recesses formed in the end face of an intervening power transmitting member which is of considerable length measured longitudinally of the shafts so that it is capable of assuming a position having a high degree of angularity with respect to the axes of the two shafts without disturbing its efficient operation as a power transmitting member. Still another object of the invention is to provide an improved coupling of the type referred to in which the intermediate power transmitting member, having recesses or sockets to receive the lugs or jaws carried by the coupling members, is formed partly or wholly of deformable resilient material which may preferably be a moulded body of rubber or a resilient commercial material known as "Pennite" which may have varying degrees of hardness and resiliency in its different parts so that those portions of the power transmitting member which contact with the lugs or jaws have greater deformability and resiliency than the remaining portions of the power transmitting member with which they are integrally formed. A further object of the invention is to provide a coupling of the improved type referred to above in which the intervening power transmitting member is of such length that torsional stresses are set up therein when forces are transmitted from one coupling to the other, while the forces acting upon those portions of the power transmitting member which extend between the lugs or jaws carried by one coupling member tend to shear off those portions from the body of the member, thus distinguishing from the power transmitting member of the type of coupling disclosed in the above mentioned patents in which the radiating spider arms are largely under compression between lugs or jaws carried by opposite coupling members. Other objects of the invention relate to various features of construction and arrangement which will appear more fully hereinafter.

The nature of the invention will be understood from the following specification taken with the accompanying drawing in which one embodiment is illustrated. In the drawing, Fig. 1 shows a side elevation of the improved coupling of the present invention applied to two substantially aligned shafts;

Fig. 2 shows a longitudinal section taken on the line 2—2 of Fig. 1;

Fig. 3 shows a vertical section taken on the line 3—3 of Fig. 1; and

Fig. 4 shows a vertical section taken on the line 4—4 of Fig. 1.

As shown in the drawing, the improved coupling of the present invention comprises a pair of metallic coupling members 10 and 11 which are secured by keys 12 upon the ends of two substantially aligned shafts 13 and 14, respectively. The coupling members 10 and 11 are substantially cylindrical in form and they receive between them an intermediate power transmitting member 15 which is formed preferably of non-metallic, resilient, deformable material or which embodies such resilient, deformable material in the regions where it contacts with parts of the coupling members.

The coupling member 10 comprises a plurality of longitudinally extending lugs or jaws 10ª which are adapted to enter recesses or sockets 15ª formed in one end of the intermediate power transmitting member 15 and the other coupling member 11 has a plurality of similar longitudinally extending lugs or jaws 11ª which are adapted to enter another series of recesses or sockets 15ª formed in the other end of the member 15. The lugs or jaws 10ª and 11ª are each provided with opposite outwardly diverging faces 10ᵇ and 11ᵇ, respectively, which are adapted to co-act with the similar outwardly diverging opposite faces 15ᵇ of the recesses 15ª. The inner faces of the lugs or jaws 10ª which connect the faces 10ᵇ are curved as shown at 10ᶜ and similar curved portions 11ᶜ connect the faces 11ᵇ of each lug or jaw 11ª. These curved portions 10ᶜ and 11ᶜ are preferably spaced slightly from the corresponding curved surfaces 15ᶜ which connect the opposite side walls 15ᵇ of the recesses or the sockets 15ª, thus providing clearances 16 which are adapted to permit a substantial degree of tilting movement of the member 15 with respect to the shafts 13 and 14 for the purpose of compensating for angular misalignment or relative lateral displacement of the shafts. The parts are so constructed that when they are assembled with respect to the two shafts 13 and 14 there are clearances between the end faces of the member 15 and the adjacent end faces of the coupling members 10 and 11, as shown at 17, and corresponding clearances 18 between the end faces 10ᵈ and 11ᵈ of the jaws 10ª and 11ª, respectively, and the adjacent end walls 15ᵈ of the recesses or the sockets 15ª, thus permitting some relative endwise movement of the power transmitting member 15 with respect to the coupling members 10 and 11.

The intermediate power transmitting member is formed preferably as a moulded body of some resilient compressible material, such as rubber or a commercial product known as "Pennite", which is capable of being formed with different degrees of hardness and resiliency in different parts of its structure so that the portions 15ᵉ which constitute the side walls of the recesses or sockets 15ª are comparatively soft and quite resilient as compared with the remaining portions 15ᶠ which may be quite hard and more or less unyielding. This permits the parts 15ᵉ to be substantially compressed to take up shock when forces are transmitted from one coupling member to the other, particularly when the apparatus including the shafts 13 and 14 is first started in operation. With this arrangement of the parts, a resilient power transmitting connection is provided between the two shafts and this connection is of such a nature that it permits compensation for a relatively large degree of angular misalignment or lateral displacement of the shafts.

It will be observed that the power transmitting member 15 is of considerable length longitudinally of the coupling and that the sockets at opposite ends of the member are displaced a considerable distance from each other which causes torsional stresses to be set up in the intermediate portions of the member while shearing stresses are produced in portions adjacent the sockets. The walls of adjacent sockets are connected circumferentially and transversely of the power transmitting member by solid bodies of the material of which the member is formed so that there is no possibility of rupture of the member when it is properly proportioned for the load to be transmitted. The sockets at one end of the power transmitting member are preferably staggered with respect to those at the other end. When the coupling is in use and the portions 15ᵉ of the intermediate member 15 are subjected to compression at one side of each socket, there will be a compression of one side wall of each socket with a resulting clearance between the opposite wall of that socket and the opposite face of the jaw which engages that socket but, due to the fact that the bottoms of the sockets are of harder and less yielding material, the bottoms of the sockets will serve to maintain a substantial degree of concentricity between each end of the member 15 and the adjacent coupling member which is interlocked with it, and this condition will be maintained even after the deformable walls of the sockets have been worn to a considerable degree. The condition shown in the drawing where each side face of each jaw engages one wall of a socket is the condition which exists when there is no load on the coupling; when forces are being transmitted through the coupling, one side wall of each socket will be compressed and there will be a clearance adjacent the opposite side.

Although one form of the invention has been shown and described by way of illustration, it will be understood that it may be constructed in various other embodiments which come within the scope of the appended claims.

I claim:

1. The combination in a coupling for connecting a pair of substantially aligned shafts and compensating for relative lateral displacement, angular misalignment and relative endwise movement of said shafts, of a pair of coupling members each adapted to be secured upon a separate one of said shafts, each of said coupling members being provided with a plurality of longitudinally extending jaws, said coupling members being spaced apart to prevent overlapping of said jaws carried by opposite coupling members, and an elongated intermediate power transmitting member having sockets extending inwardly from its ends and engaged by said jaws to permit free relative endwise and rocking movements of the jaws and the intermediate member, the portion of said power transmitting member between said coupling members being substantially unyielding.

2. The combination in a coupling for connecting a pair of substantially aligned shafts and compensating for relative lateral displacement, angular misalignment and relative endwise movement of said shafts, of a pair of coupling members each adapted to be secured upon a separate one of said shafts, each of said coupling members being provided with a plurality of longitudinally extending jaws, said coupling members being spaced apart to prevent overlapping of said jaws carried by opposite coupling members, and an elongated intermediate power transmitting member having sockets extending inwardly from its ends and engaged by said jaws to permit free relative endwise and rocking movements of the jaws and the intermediate member, the walls of said sockets being formed of resilient material adapted to be deformed when forces are transmitted from one coupling member to the other, the portion of said power transmitting member between said coupling members being substantially unyielding.

3. The combination in a coupling for connecting a pair of substantially aligned shafts and compensating for relative lateral displacement, angular misalignment and relative endwise movement of said shafts, of a pair of coupling members each adapted to be secured upon a separate one of said shafts, each of said coupling members being provided with a plurality of longitudinally extending jaws, said coupling members being spaced apart to prevent overlapping of said jaws carried by opposite coupling members, and an elongated intermediate power transmitting member having sockets extending inwardly from its ends and engaged by said jaws to permit free relative endwise and rocking movements of the jaws and the intermediate member, the walls of said sockets being formed of resilient material adapted to be deformed when forces are transmitted from one coupling member to the other and being formed to cause the axis of said power transmitting member substantially to intersect the axes of said coupling members at the ends of said power transmitting member when said shafts are out of alignment, the portion of said power transmitting member between said coupling members being substantially unyielding.

4. The combination in a coupling for connecting a pair of substantially aligned shafts and compensating for relative lateral displacement, angular misalignment and relative endwise movement of said shafts, of a pair of coupling members each adapted to be secured upon a separate one of said shafts, each of said coupling members being provided with a plurality of longitudinally extending jaws, said coupling members being spaced apart to prevent overlapping of said jaws carried by opposite coupling members, and an elongated intermediate power transmitting member having sockets extending inwardly from its ends and engaged by said jaws, each of said jaws having opposite outwardly diverging faces adapted to contact with correspondingly-shaped opposite walls of one of said sockets, said faces and said walls being formed to permit free relative endwise and rocking movements of said jaws and said intermediate member, the walls of said sockets being formed of resilient material adapted to be deformed when forces are transmitted from one coupling member to the other, the portion of said power transmitting member between said coupling members being substantially unyielding.

5. The combination in a coupling for connecting a pair of substantially aligned shafts and compensating for relative lateral displacement, angular misalignment and relative endwise movement of said shafts, of a pair of coupling members each adapted to be secured upon a separate one of said shafts, each of said coupling members being provided with a plurality of longitudinally extending jaws, said coupling members being spaced apart to prevent overlapping of said jaws carried by opposite coupling members, and an elongated intermediate power transmitting member having sockets extending inwardly from its ends and engaged by said jaws to permit free relative endwise and rocking movements of said jaws and said intermediate member, said power transmitting member being formed as a composite body of molded resilient material having different degrees of deformability in different portions thereof, the walls of said sockets being capable of being deformed when forces are transmitted from one coupling member to the other and the portion of said power transmitting member between said coupling members being substantially unyielding.

LOUIS RICEFIELD.